Sept. 13, 1938.  I. E. GOLDMAN  2,129,759
FILM VIEWING DEVICE
Filed Feb. 3, 1937
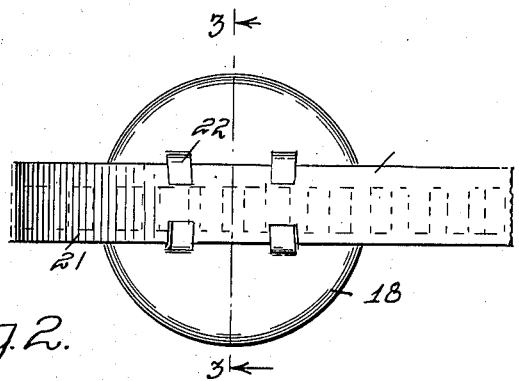
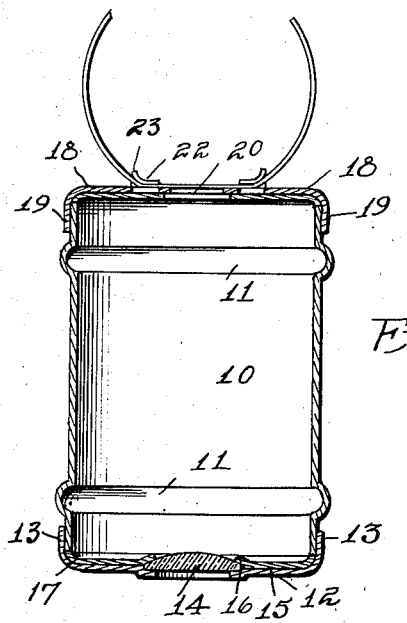
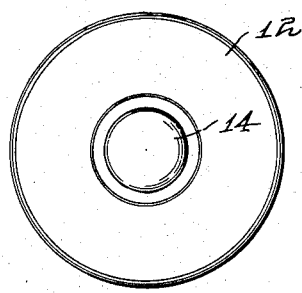
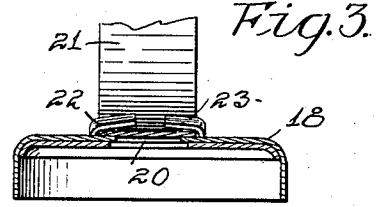
Inventor
Isaac E. Goldman Patented Sept. 13, 1938

2,129,759

UNITED STATES PATENT OFFICE 2,129,759

FILM VIEWING DEVICE

Isaac E. Goldman, Des Moines, Iowa

Application February 3, 1937, Serial No. 123,817

1 Claim. (Cl. 40—28)

My invention relates to that class of film viewing devices in which a photographic film of the class commonly used in so-called moving pictures may be manually moved over a sight opening and viewed through a magnifying lens, and of such size that it may readily and easily be held in an operator's one hand while with the other hand the film may be moved to present new pictures on the film to the operator's view.

My object is to provide a device of this class of simple, durable and inexpensive construction and which may be formed complete by ordinary dies and formers and assembled without machine work.

More specifically, it is my object to provide a device of this class in which the resilience of the coiled film may be utilized in firmly holding the film in position relative to the sight opening to thereby prevent the entrance of light under the film and yet permit the operator to readily and easily move the film to present all of the pictures printed upon the film to the view of the operator, and further to prevent scratching of the film at the portions thereof where the pictures are printed.

My invention consists in the construction, arrangement and combination of the various parts of the device, whereby the objects contemplated are attained, as hereinafter more fully set forth, pointed out in my claim, and illustrated in the accompanying drawing, in which:

Figure 1 shows a central longitudinal sectional view of a device embodying my invention;

Figure 2 shows an end elevation of same at the end where the film is placed;

Figure 3 shows a sectional view on the line 3—3 of Figure 2; and

Figure 4 shows an end elevation of the device at the end containing the lens.

All of the figures of the drawing show the device on an enlarged scale, the device being about half the size shown.

Referring to the accompanying drawing, I have used the reference numeral 10 to indicate generally the body of the device. This is preferably made of sheet metal cylindrical in form and braced by two annular ribs 11 and open at both ends. It may be constructed cheaply by the use of the same machinery as is commonly employed in making cans.

At one end of the body is a cap 12, also formed of sheet metal and having a cylindrical marginal flange 13 to slidingly fit over one end of the body, and also formed with a sight opening at its central portion. For supporting the magnifying lens 14 adjacent said sight opening I provide a sheet metal disc 15, having a central opening with the material adjacent the opening flared inwardly at 16 and its marginal edge formed with a small inwardly extended flange 17.

In assembling this lens member the lens is placed between the cap 12 and disc 15, then the disc is forced into position within the cap and firmly held in such position by the resiliency of the metal. In this manner the lens is firmly fixed in position within the cap and the cap is frictionally held in position on the body 10 and may be adjusted longitudinally of the body as may be required in focusing the lens.

At the opposite end of the body is a similar cap 18 formed of metal and having an inwardly extended marginal flange 19 to frictionally engage the outer surface of the end portion of the body 10. It is provided with a sight opening at 20.

The strip of picture film is of the ordinary construction and is provided with a series of miniature pictures whose positions thereon are indicated by dotted lines at 21, Figure 2. These films are customarily shipped, handled and stored in coiled form, and due to their resiliency they will yieldingly tend to return to said coiled form when released.

For supporting the film in proper position relative to the sight opening 20 I have formed from the metal of the cap 18 four lugs 22. At four opposite corners of the sight opening these lugs are bent first outwardly a short distance from the cap and then toward the center of the film, as shown in Figure 2, and are inclined slightly outwardly from the cap, as shown in Figure 3, so that the lugs engage the edge portions only of the film and, hence, cannot scratch that portion of the film on which the pictures are printed.

The outer edges of the sides of the lugs are preferably curved at 23, as shown in Figure 1, to conform to the normal curvature of the film at that point.

On the interior of the cap 18 I preferably provide a metal disc 24 having a sight opening and having a marginal flange 25 which is forced by pressure to frictionally engage the interior of the flange 19 and be thereby held in place. It serves to exclude light from entering the interior of the body through the openings formed by the cutting of the lugs 22 from the material of the cap 18.

These caps and discs may be cheaply formed by the mechanisms now in common use for the formation of can caps and need no special machinery or hand work.

In practical use the body is held by the operator in one hand, then one end of the coiled film is inserted between the lugs 22 over the sight opening 20, then the lens is held adjacent the operator's eye and toward a light and the film grasped by the operator's other hand and moved progressively to display one complete picture on the film at a time. The interior of the body and caps is of dark color to absorb light. I have found in practice that the resilience of the coiled film will yieldingly hold it in any position in which it may be placed relative to the sight opening, and yet it may be easily moved from picture to picture. Furthermore, I have found that because of the curvature of the film and the shape and positioning of the lugs 22 that portion of the film adjacent the sight opening will be yieldingly held in position flat against the outer surface of the cap around the sight opening, to thereby prevent light from entering the interior of the body between the film and the outer surface of the cap surrounding the sight opening, and also that the same film may be employed many times without scratching those portions thereof where the pictures are contained, even though the lugs and the sight opening formed with dies and cutters are not machined or otherwise smoothed.

I have also demonstrated that the entire device may be constructed in quantities at a minimum of cost.

I claim as my invention:

In a film viewing device the combination of a cylindrical body portion, a cap at one end of the body portion formed with a centrally arranged sight opening, two lugs formed integral with the cap at one side of said sight opening and having their free ends extended toward each other and inclined outwardly from the surface of the cap, thereby forming a tapered notch between the free end of each lug and the adjacent surface of the cap, a second similar pair of lugs at the opposite side of the opening, the side edge of each lug furthest from the opening being curved outwardly away from the cap, for the purposes stated.

ISAAC E. GOLDMAN.